Jan. 1, 1924. 1,479,325

J. SCHUBNEL

CHUCK

Filed Oct. 8, 1921 2 Sheets-Sheet 1

Inventor
Joseph Schubnel.
By
Attorney

Jan. 1, 1924 1,479,325
J. SCHUBNEL
CHUCK
Filed Oct. 8, 1921 2 Sheets-Sheet 2
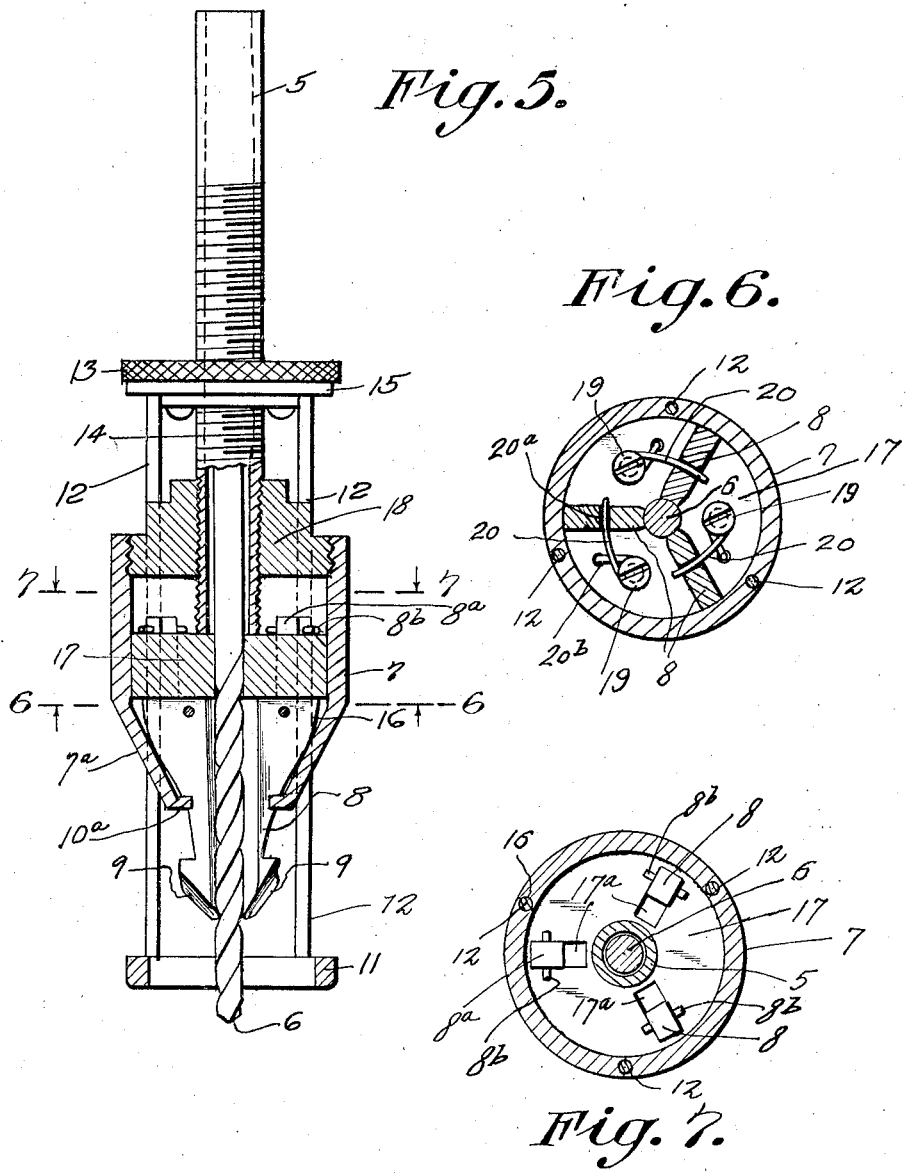
Inventor
Joseph Schubnel.

Patented Jan. 1, 1924.

1,479,325

UNITED STATES PATENT OFFICE.

JOSEPH SCHUBNEL, OF NORTH ADAMS, MASSACHUSETTS.

CHUCK.

Application filed October 8, 1921. Serial No. 506,510.

*To all whom it may concern:*

Be it known that I, JOSEPH SCHUBNEL, a citizen of France, residing at North Adams, in the County of Berkshire and State of Massachusetts, have invented new and useful Improvements in Chucks, of which the following is a specification.

This invention relates to chucks which are used for holding drills and similar tools for making holes in metal or other material, and its object is to provide the chuck with a means for countersinking the hole made by the drill, and also to provide a gage device for determining the depth of the hole made by the drill, as well as the depth of the countersink.

A further object is to provide a novel and improved arrangement of chuck jaws and other parts which permits the drill to be run up into the chuck body when a very short portion of the drill is required, as when drilling a shallow hole.

The objects stated are attained by means of a novel combination and arrangement of parts to be hereinafter described and claimed, and in order that the same may be better understood, reference is had to the accompanying drawings, forming a part of this specification.

Figure 1:
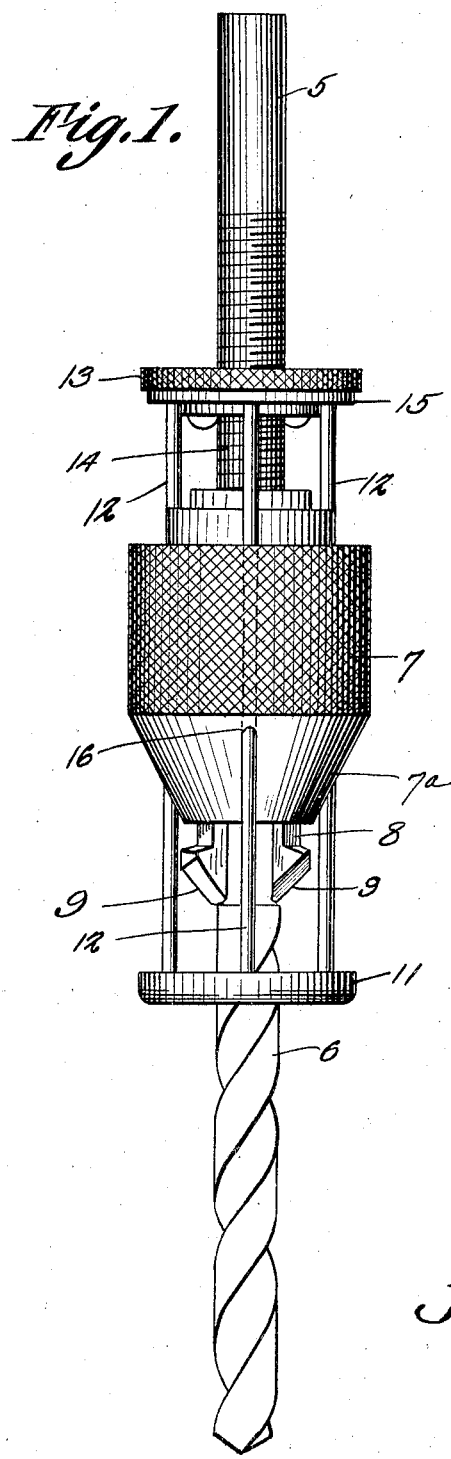
Figure 1 is an elevation of the tool.
Figure 2:
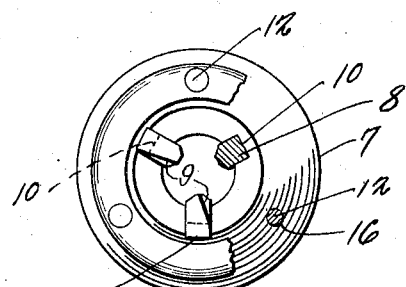
Fig. 2 is an end view thereof partly broken away.
Figure 3:
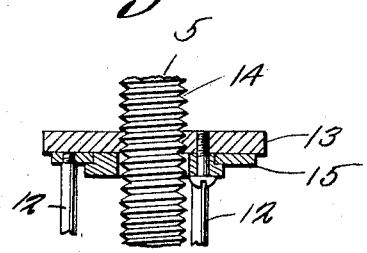
Fig. 3 is a sectional detail of a gage-adjusting means.
Figure 4:
Fig. 4 is a cross-section of a gage ring.

Fig. 5 is a vertical section of the chuck, and Figs. 6 and 7 are cross-sections on the lines 6—6 and 7—7 of Fig. 5.

Referring specifically to the drawing, 5 denotes a drill shank or similar element carrying a chuck which holds the drill 6 the latter being an ordinary twist or other drill. The chuck consists of a body 7 carrying jaws 8 which are operable to grip the drill 6.

In order that a hole may be made by the drill 6, and the hole countersunk with one operation, the outer ends of the jaws 8 which protrude from the chuck body 7, are shaped to form cutters, they being formed with outwardly presented cutting edges 9, and said edges being arranged at an oblique angle to the longitudinal axis of the drill so as to countersink the hole made by the latter as the tool advances and the cutting edges 9 enter the hole. The wall of the opening in the chuck body 7 in which the shanks of the jaws 8 are located, has notches 10 in which said shanks seat, whereby they are securely held and prevented from slipping around relative to the drill during the countersinking operation.

A gage device is also provided for determining the depth of the hole made by the drill 6, as well as the depth of the countersink. This gage device is a ring 11 carried by rods 12 mounted for a sliding movement in the direction of the length of the drill, the ring being positioned at the forward end of the chuck body 7 so that it may encircle the drill 6 and the protruding ends of the jaws 8 having the cutting edges 9. If the ring is to gage the depth of the hole made by the drill 6 it will be advanced to encircle the latter a distance from its point corresponding to the desired depth of the hole. It will therefore be seen that the advance of the drill is stopped when the ring 11 reaches the work in which a hole is being made by the drill. To gage the depth of the countersink, the ring 11 is set to stop the advance of the tool when the cutting edges 9 have penetrated the drilled hole a distance corresponding to the desired depth of the countersink.

The ring 11 is adjusted by a nut 13 mounted on a threaded portion 14 of the shank 5, and having a swiveled connection with a ring 15, to which latter the rods 12 are connected at their rear ends. When the nut 13 is rotated it travels on the threaded portion 14 of the shank 5 and carries the ring 15 along with it, and as said ring carries the rods 12 and the latter are connected to the gage ring 11, said gage ring is advanced or retracted and thus set to determine the depth of the hole and the countersink as hereinbefore described. The chuck body 7 has longitudinal holes 16 through which the rods 12 slidably pass, and by which they are guided.

The body 7 is cylindrical and hollow, with its forward end tapered to a conical shape, as shown at 7ª, and formed at its extremity with an internal annular flange 10ª containing the notches 10 hereinbefore referred to. To grip the drill 6, the jaws 8 are moved downwardly in the body 7, which movement, by reason of the cone 7ª, causes them to advance toward each other in an obvious manner.

In order that the jaws 8 may be operated as described, they are carried by a slidable support consisting of a cylindrical block 17 loosely mounted in the body 7 so that it may be moved down therein, this being done by the shank 5, the same having its lower end bearing against the top of the block. The shank 5 is externally threaded and it runs through a nut 18 seating in the top of the body 7 and secured by a screw-threaded connection. The jaws 8 are advanced to grip the drill 6 by screwing the shank 5 in a direction to advance the block 17, and when the shank is unscrewed, the block can back to effect the release movement of the jaws.

The block 17 has edge notches 17$^a$ in which the reduced upper ends 8$^a$ of the jaws 8 seat, and above the block, the jaws carry cross pins 8$^b$ to prevent the jaws from dropping down and away from the block.

On the bottom of the block 17 are headed screw studs or similar devices 19 around which are coiled, intermediate their ends, springs 20 engageable with the jaws 8 in such a manner that they have a normal spreading tendency, to facilitate release of the drill 6 when the shank 5 is unscrewed. As shown in Fig. 6, one end of a spring 20 extends laterally from the studs 19 and is inserted into a transverse aperture 20$^a$ in a jaw, and the other end of the spring is anchored to the block 17 by being inserted into an aperture 20$^b$ in the bottom thereof.

It will be noted in Fig. 5 that the block 17 has a central aperture and that the shank 5 is hollow. This is for the purpose of allowing the drill 6 to be run back into the shank if a very shallow hole is to be drilled and hence only a very short length of protruding drill required, the arrangement of the springs 20 being such that they do not interfere with this operation, they being entirely out of the way of the drill.

I claim:

1. A drill chuck comprising a body, and drill-gripping jaws protruding from the forward end thereof, said protruding ends of the jaws having countersinking cutting edges, a gage ring carried by the chuck body, and adjustable to project from the forward end of the chuck body, and having a diameter to encircle the protruding ends of the jaws, a shank carrying the chuck body, and having a threaded portion, a traveling nut on said threaded portion, rods carrying the gage ring and slidably supported by the chuck body, and a member swiveled to the nut and having a connection with the rods.

2. A drill chuck comprising a body, drill-gripping jaws carried thereby, a gage ring adjustable to project from the forward end of the chuck body, a shank carried by the chuck and having a threaded portion, a traveling nut on said threaded portion, rods carrying the gage ring and slidably supported by the chuck body, and a member swiveled to the nut and having a connection with the rods.

In testimony whereof I affix my signature.

JOSEPH SCHUBNEL.